June 28, 1949.  J. H. HULLINGER  2,474,529
UNIVERSAL JOINT
Filed Aug. 7, 1948
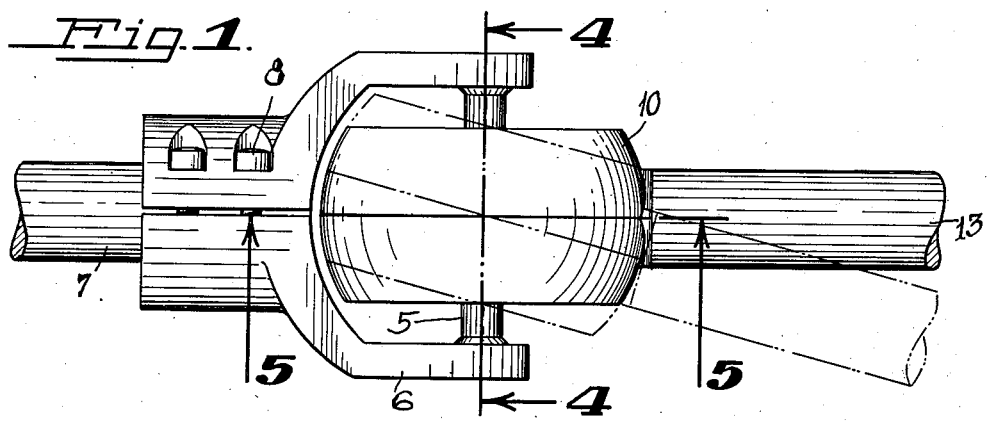
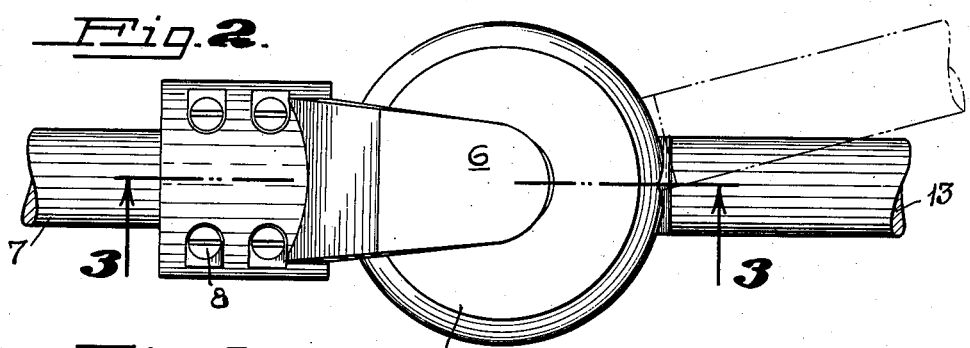
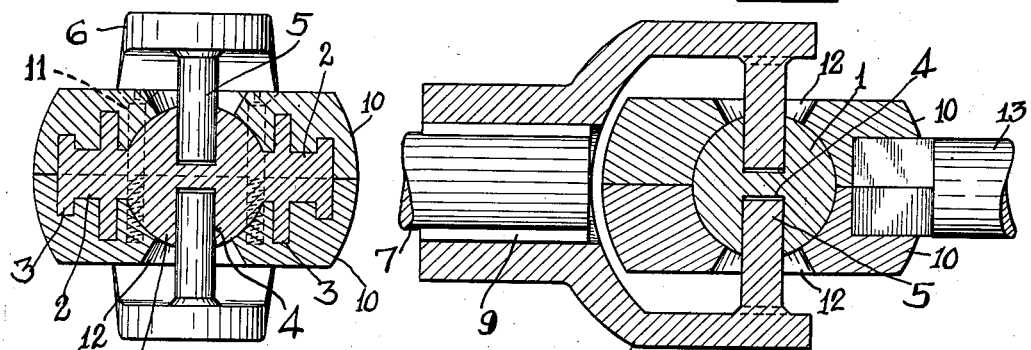
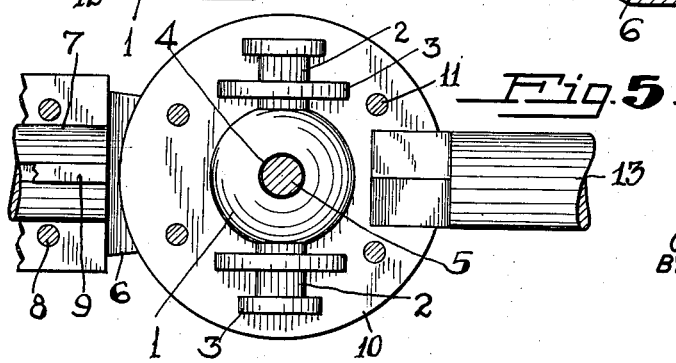
INVENTOR.
John H. Hullinger
BY
J. E. Trabucco
ATTORNEY.

Patented June 28, 1949

2,474,529

UNITED STATES PATENT OFFICE 2,474,529

UNIVERSAL JOINT

John H. Hullinger, San Francisco, Calif.

Application August 7, 1948, Serial No. 43,070

5 Claims. (Cl. 64—17)

This invention relates to improvements in universal joints.

The primary object of my invention is to provide a novel universal joint adapted to efficiently operate without slippage in various adjusted positions, and which is capable of being continuously used without the necessity of periodical adjustments.

Other objects of the present invention will be pointed out or will present themselves in the description to follow. It is to be understood, however, that the present disclosure is for illustration purposes only and that my invention is capable of being embodied in various other forms coming within the spirit of the invention. For this and other apparent reasons the universal joint herein shown and described is not to be taken as exhaustive of the variations my invention may assume in the art.

In the accompanying drawings:

Fig. 1 is a top plan view of a universal joint embodying my invention;

Fig. 2 is a side elevation of the same;

Fig. 3 is a sectional view taken on the line 3—3 of Fig. 2;

Fig. 4 is a sectional view taken on the line 4—4 of Fig. 1; and

Fig. 5 is a sectional view taken on the line 5—5 of Fig. 1.

Referring to the drawings the numeral 1 designates an inner globular bearing member having outwardly disposed aligned extensions 2 on which are formed circular flanges 3. The globular member is formed with aligned axial sockets or openings 4 which are arranged at right angles to the extensions, the said sockets being separated at their inner ends by a central portion of the said globular member. The globular member 1 is mounted for oscillatory movement on two inwardly protruding pins 5 which are carried at the ends of a bifurcated member 6 which is made up of two assembled parts. The two parts of the bifurcated member 6 are formed with semi-circular opposed grooves which cooperate to form a recess for the reception of a shaft 7. The two parts of the bifurcated member 6 are securely clamped together to effect the firm connection of the shaft thereto by means of screws 8. The two parts of the bifurcated member 6 are keyed to the shaft 7 as at 9 to prevent the relative independent rotation of the bifurcated member with respect to the shaft.

The globular member 1 and its extensions 2 are rotatably supported between two suitably grooved block portions 10, 10 which are secured together by screws 11 or other means to form a unitary block. The block portions are formed with identical grooves at their inner sides which are shaped to receive the globular member 1, the extensions 2 and the latter's circular flanges 3, the sides of the said grooves providing bearing surfaces for the independent turning of the globular member with respect to the block and vice versa. The outer sides of the block portions are provided with enlarged axial openings 12 through which the pins 5 of the bifurcated member 6 extend. Secured within a suitably shaped recess formed in an end of the block is a shaft 13 which is firmly clamped between the said block portions and is not independently rotatable with respect to the latter. The shafts 7 and 13 are ordinarily connected in the usual manner to the driving and driven elements of a transmission. The globular member 1 is prevented from shifting laterally on the pins 5 when the device is in operation, thereby avoiding the frictional engagement of the block with respect to the bifurcated member 6.

It is to be noted that the shafts 7 and 13 may be positioned at different angles with respect to each other as shown by the broken lines in Figs. 1 and 2.

What I claim is:

1. A universal joint comprising a substantially globular member having laterally disposed aligned extensions and a pair of axial sockets at its opposite sides, the sockets and the extension being at right angles to each other, a pair of opposed block portions secured together and having opposed grooves at their inner faces within which the globular member rotatably fits, and a bifurcated member having inwardly protruding pins rotatably extending into the sockets of globular member.

2. A universal joint comprising a globular member having axial sockets extending inwardly from its opposite sides, a block made up of two joined portions having opposed grooves within which the globular member is rotataly mounted, and a bifurcated member made up of two joined portions having inwardly proturding pins rotatably extending into the sockets of the globular member.

3. A universal joint comprising a substantially globular member having aligned axial sockets extending inwardly from its outer surface, a block within which the globular member is rotatably positioned, the said block having axial openings in its lateral sides, the axial openings being normally in alignment with the sockets of the globular members and a bifurcated member having inwardly protruding pins rotatably extending into the sockets of the globular member.

4. A universal joint comprising a substantially globular member having axial sockets extending inwardly from its sides, a block having two portions secured together, the said portions having opposed grooves at their inner faces and the said globular member being rotatably mounted in the said grooves, a bifurcated member having inwardly aligned pins rotatably lodged in the axial sockets of the globular member, and a shaft secured to the bifurcated member and to the block.

5. A universal joint comprising a bifurcated member having inwardly protruding aligned pins, a substantially globular member rotatably mounted on the pins, a pair of aligned extensions formed on the globular member, the said extensions being positioned at right angles to the pins, and a block having two portions secured together, the said portions having opposed grooves on their inner faces and the said globular member and its extensions being rotatably positioned in the said grooves.

JOHN H. HULLINGER.

No references cited.